(12) United States Patent
Ma et al.

(10) Patent No.: US 12,356,328 B2
(45) Date of Patent: Jul. 8, 2025

(54) REDUCED POWER CONSUMPTION WIRELESS COMMUNICATIONS

(71) Applicant: ZTE Corporation, Guangdong (CN)

(72) Inventors: Xiaoying Ma, Shenzhen (CN); Jun Xu, Shenzhen (CN); Mengzhu Chen, Shenzhen (CN); Qiujin Guo, Shenzhen (CN); Focai Peng, Shenzhen (CN); Xuan Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 370 days.

(21) Appl. No.: 17/949,662

(22) Filed: Sep. 21, 2022

(65) Prior Publication Data

US 2023/0011965 A1   Jan. 12, 2023

Related U.S. Application Data

(63) Continuation of application No. PCT/CN2020/099278, filed on Jun. 30, 2020.

(51) Int. Cl.
*H04W 52/02* (2009.01)
*H04L 5/00* (2006.01)
*H04W 72/23* (2023.01)

(52) U.S. Cl.
CPC ....... *H04W 52/0229* (2013.01); *H04L 5/0053* (2013.01); *H04W 72/23* (2023.01)

(58) Field of Classification Search
CPC . H04W 52/0229; H04W 72/23; H04W 76/15; H04W 52/0216; H04L 5/0053; Y02D 30/70
See application file for complete search history.

(56) References Cited

U.S. PATENT DOCUMENTS

| 11,943,711 | B2 * | 3/2024 | Li ..................... H04W 52/0229 |
| 12,114,391 | B2 * | 10/2024 | Zhou .................... H04W 76/11 |
| 2012/0213137 | A1 | 8/2012 | Jeong et al. |
| 2019/0082457 | A1 | 3/2019 | Zhou et al. |

(Continued)

FOREIGN PATENT DOCUMENTS

| CN | 110536404 A | 12/2019 |
| CN | 110546982 A | 12/2019 |

(Continued)

OTHER PUBLICATIONS

ZTE, "Remaining issues in WUS PDCCH," 3GPP TSG RAN WG1 #100, e-Meeting, R1-2000511, 8 pages, Feb. 24-Mar. 6, 2020.
CATT, "Summary of Phase 1 Discussion on PDCCH-based Power Saving Signal/Channel," 3GPP TSG RAN WG1 #100e, R1-2001248, 21 pages, Feb. 17-21, 2020.

(Continued)

*Primary Examiner* — Asad M Nawaz
*Assistant Examiner* — Hugh Mark Ashley
(74) *Attorney, Agent, or Firm* — Perkins Coie LLP

(57) ABSTRACT

Methods, apparatuses, and systems for reducing the power consumption of wireless communications devices are disclosed. In one aspect, a wireless communication method is disclosed. The method includes receiving, by a wireless device from a network device, indication information on a control channel. The method further includes determining, by the wireless device, validity of the indication information based on a high layer signaling or predefined information, and applying, in a case that the indication information is determined to be valid, a power saving parameter based on the indication information.

20 Claims, 7 Drawing Sheets

(56) References Cited

U.S. PATENT DOCUMENTS

| | | | |
|---|---|---|---|
| 2020/0092814 A1 | 3/2020 | Zhou et al. | |
| 2021/0022167 A1* | 1/2021 | Khoshnevisan | ...... H04W 72/23 |
| 2021/0168715 A1 | 6/2021 | Huang et al. | |
| 2021/0329557 A1 | 10/2021 | Zhou et al. | |
| 2022/0217579 A1* | 7/2022 | Seo | ................... H04W 72/0446 |
| 2023/0076897 A1* | 3/2023 | Svedman | .............. H04W 72/23 |

FOREIGN PATENT DOCUMENTS

| | | |
|---|---|---|
| CN | 110830198 A | 2/2020 |
| CN | 110831128 A | 2/2020 |
| CN | 110875811 A | 3/2020 |
| CN | 110876185 A | 3/2020 |
| CN | 111278091 A | 6/2020 |
| EP | 4007384 A1 | 6/2022 |
| WO | 2017193347 A1 | 11/2017 |

OTHER PUBLICATIONS

International Search Report and Written Opinion for International Application No. PCT/CN2020/099278, mailed on Mar. 29, 2021 (9 pages).

LG Electronics, "Remaining issues on PDCCH-based power saving signal/channel," 3GPP TSG RAN WG1 #101, R1-2004025, e-Meeting, May 25-Jun. 5, 2020 (3 pages).

Office Action for Chinese Patent Application No. 202080100060.4, mailed Sep. 4, 2024 (11 pages).

Office Action for Chinese Patent Application No. 202080100060.4, mailed Apr. 30, 2025 (9 pages).

* cited by examiner

400

```
┌─────────────────────────────────────────────┐
│ Transmitting, by a network device to a      │  410
│ wireless device, a resource configuration   │
│ via high layer signaling                    │
└─────────────────────────────────────────────┘
                     │
                     ▼
┌─────────────────────────────────────────────┐
│ Determining, by the network device,         │  420
│ validity of indication information based    │
│ on the high layer signaling or              │
│ predefined information                      │
└─────────────────────────────────────────────┘
                     │
                     ▼
┌─────────────────────────────────────────────┐
│ Transmitting, to the wireless device, the   │  430
│ indication information in a resource        │
│ configured by the resource configuration    │
└─────────────────────────────────────────────┘
```

FIG. 4

REDUCED POWER CONSUMPTION WIRELESS COMMUNICATIONS

CROSS REFERENCE TO RELATED APPLICATIONS

This patent document is a continuation of and claims benefit of priority to International Patent Application No. PCT/CN2020/099278, filed on Jun. 30, 2020. The entire content of the before-mentioned patent application is incorporated by reference as part of the disclosure of this application.

TECHNICAL FIELD

This patent document is directed generally to wireless communications.

BACKGROUND

With the development of wireless communications technology, the transmission rate, delay, throughput, reliability and other performance metrics of wireless communications systems have been improved by using high frequencies, large bandwidths, multiple antennas, as well as other technologies. To achieve high-performance wireless transmission, terminals carry out complex processing such as monitoring large control channel bandwidths, processing for data encoding and decoding for more complex control information and data information, etc. The power consumption of a user terminal affects a user's experience. Accordingly, power saving to reduce terminal power consumption is a problem that wireless communication systems need to solve.

SUMMARY

This patent document describes, among other things, techniques for reducing the power consumption of wireless communications devices.

In one aspect, a wireless communication method is disclosed. The method includes receiving, by a wireless device from a network device, indication information on a control channel. The method further includes determining, by the wireless device, validity of the indication information based on a high layer signaling or predefined information, and applying, in a case that the indication information is determined to be valid, a power saving parameter based on the indication information.

In another aspect, another wireless communication method is disclosed. The method includes transmitting, by a network device to a wireless device, a resource configuration via high layer signaling. The method further includes determining to cause a power saving parameter to be applied at the wireless device; and transmitting, to the wireless device, indication information, in a resource configured by the resource configuration.

In another aspect, a wireless device is disclosed. The wireless device includes a transceiver configured to receive from a network device indication information on a control channel, and a processor configured to determine validity of the indication information based on a high layer signaling or predefined information, and apply, in a case that the indication information is determined to be valid, a power saving parameter based on the indication information.

In another aspect, a network device is disclosed. The network device includes a transceiver configured to transmit to a wireless device a resource configuration via high layer signaling, and transmit to the wireless device indication information in a resource configured by the resource configuration; and a processor configured to determine validity of indication information based on the high layer signaling or predefined information.

These, and other, aspects are described in the present document.

BRIEF DESCRIPTION OF DRAWINGS

FIG. 4 depicts another example of a process, in accordance with some example embodiments.

DETAILED DESCRIPTION

Certain features are described using the example of Fifth Generation (5G) wireless protocol. However, applicability of the disclosed techniques is not limited to only 5G wireless systems. The disclosed subject matter relates to power saving technology for terminals in a wireless communications system. Section headings and section numbers shown below are included to clarify some example embodiments.

In the 5G new radio (NR), terminals may suffer performance loss due to blockage effects that affect signal reception. Multi-transmission and reception point (TRP) technology may be used to reduce negative effects of signal blockage. Multi-TRP can help improve the reliability and robustness of signal reception at a wireless terminal. Multi-TRP transmits a transport block (TB) from more than one TRPs. Different TRPs will be transmitted through different propagation paths and may overcome blockage effects to one or more of the TRPs. A user equipment (UE) or wireless receiver then receives several data transmissions of one message which improves the reliability of receiving the message.

Figure 1A:
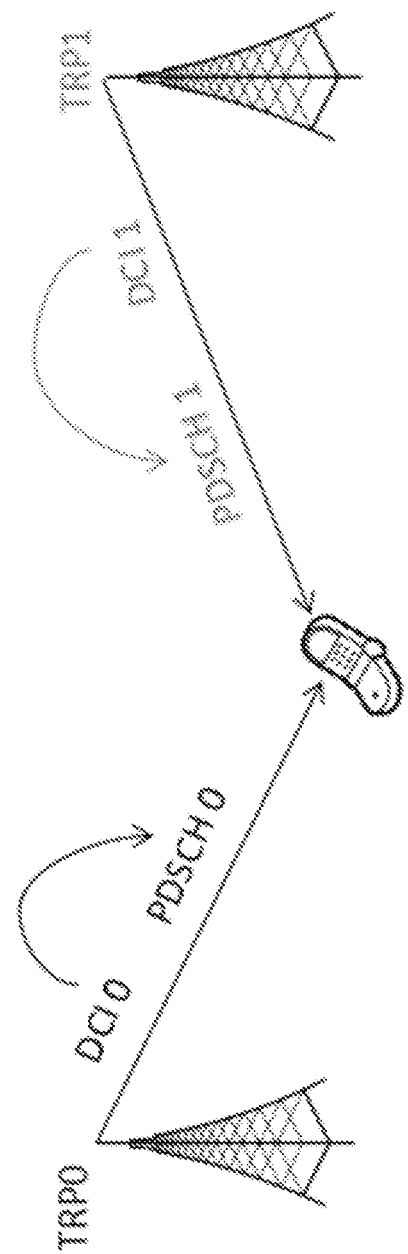
FIG. 1A depicts an example of a multi-downlink control information (DCI) based multi-transmission reception point (TRP), in accordance with some example embodiments.

Multi-TRP can be implemented in at least two ways: 1) Multiple downlink control information (DCI) based multi TRP, multiple physical downlink control channels (PDCCHs) each of which independently schedules a single associated physical downlink shared channel (PDSCH), and different PDCCHs transmitted by different TRPs; and 2) Single-DCI based multi TRP where one DCI schedules PDSCHs from more than one TRP. For multi-DCI based multi TRP, it can be used at least for enhanced mobile broadband (eMBB) with a non-ideal backhaul. However, in the scenario of a non-ideal backhaul, the different TRPs may not have good information synchronization leading to some problems. For example, when an indication comes from only one TRP and another TRP is not synced on the indication, and another TRP indicates a second indication. So a UE receives two different indications, there can be a problem of determining which one to use. The foregoing problems occur especially when UEs support UE power saving techniques. The disclosed subject matter addresses and provides solutions the these problems. Multi-DCI based multi-TRP is depicted in FIG. 1A.

In NR, if a UE is configured by the higher layer parameter PDCCH-Config which contains two different values of CORESETPoolIndex in ControlResourceSet, multi-DCI based multi-TRP can be used. A DCI from TRP 0 is monitored/transmitted in a control resource set (CORESET) with CORESETPoolIndex 0. A DCI from TRP 1 is monitored/transmitted in a CORESET with CORESETPoolIndex 1. If a UE receives a DCI indicating 2 transmission configuration indication (TCI) states by a codepoint, the UE can receive a DCI that may schedule more than one PDSCH (single DCI based multi-TRP).

Using conventional multi-TRP, a UE may consume a significant amount of power, but using the disclosed techniques power consumption can be reduced. In long-term evolution (LTE) and NR, methods to reduce UE power consumption include the following:

Bandwidth part (BWP) adaptation: A BWP includes a number of continuous physical resource blocks (PRB) with specific numerology. When a large data packet needs to be transmitted, the UE can be indicated to activate a BWP with a wide bandwidth. Otherwise, UE can be informed to switch to a BWP with a narrow bandwidth to save power. A BWP switch can be triggered by a DCI or a timer or a high layer radio resource control (RRC) signaling.

Figure 2:
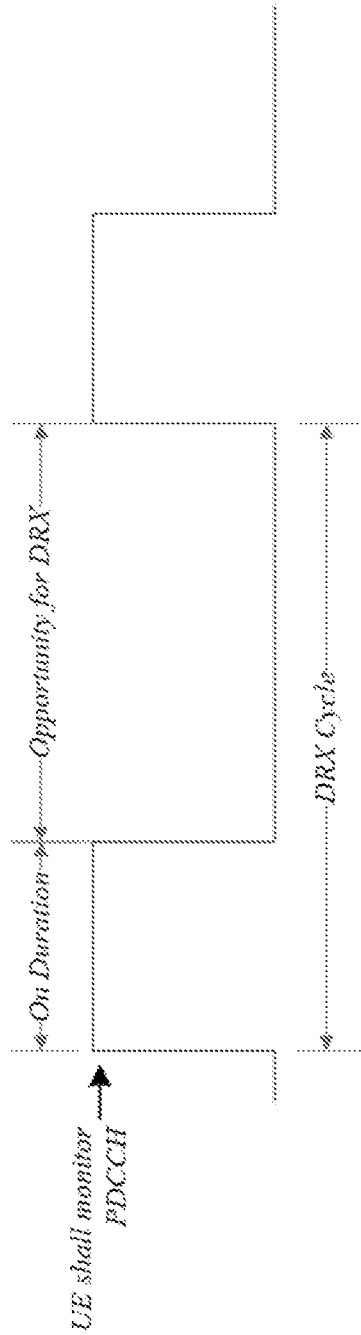
FIG. 2 depicts an example of a discontinuous reception (DRX) cycle, in accordance with some example embodiments.

Discontinuous reception (DRX) depicted in FIG. 2: DRX configures a DRX cycle for a UE, and a DRX on-duration timer begins a DRX cycle. During the DRX on-duration timer, the UE is in a 'DRX on' state and continues monitoring PDCCH and if the UE successfully decodes a PDCCH, the UE stays awake (placed in 'DRX on' state) and starts an inactivity timer. The UE can go to sleep (placed in 'DRX off' state) after the DRX on-duration timer or DRX inactivity timer has expired. In the 'DRX off' state, the UE may not monitor PDCCH to save power.

Wake-up indication: DCI format 2_6 to indicate whether or not the UE starts a DRX on-duration timer for the next DRX cycle. A UE may not start the drx-onDurationTimer for the next long DRX cycle when a value of the wake-up indication bit is '0', and the UE starts the drx-onDuration-Timer for the next long DRX cycle when a value of the wake-up indication bit is '1'.

Minimum scheduling offset indication: DCI format 0_1 or 1_1 to indicate a minimum scheduling offset value K0min or K2 min. K0min is a minimum value between a DCI and its scheduled PDSCH or aperiodic channel state information reference signal (CSI-RS). K2 min is a minimum value between a DCI and its scheduled physical uplink shared channel (PUSCH). If K0min or K2 min is greater than 0, it causes the UE to relax the PDCCH decoding process time or PDSCH processing time or PUSCH preparation time to reduce decoding power consumption. When K0min is applied, the UE is not expected to be scheduled with a DCI in slot n to receive a PDSCH scheduled with cell radio network temporary identifier (C-RNTI), configured scheduling RNTI (CS-RNTI), modulation coding scheme (MCS-RNTI) with K0 smaller than $$\left[ K0\min \cdot \frac{2^{\mu'}}{2^{\mu}} \right],$$

where K0min and µ are the applied minimum scheduling offset and the numerology of the active DL BWP of the scheduled cell when receiving the DCI in slot n, respectively, and µ' is the numerology of the new active DL BWP in case of active DL BWP change in the scheduled cell and is equal to µ, otherwise. And UE is not expected to be triggered by CSI triggering state indicated by the CSI request field in DCI in which CSI-RS triggering offset is smaller than the minimum scheduling offset K0min. When the K2 min is applied the UE is not expected to be scheduled with a DCI in slot n to transmit a PUSCH scheduled with C-RNTI, CS-RNTI, MCS-C-RNTI, or semi-persistent channel state information RNTI (SP-CSI-RNTI) with K2 smaller than $$\left[ K2\min \cdot \frac{2^{\mu'}}{2^{\mu}} \right],$$

where K2 min and µ are the applied minimum scheduling offset and the numerology of the active UL BWP of the scheduled cell when receiving the DCI in slot n, respectively, and µ' is the numerology of the new active UL BWP in case of active UL BWP change in the scheduled cell and is equal to otherwise.

Secondary cell (SCell) dormancy indication: DCI format 2-6/0-1/1-1 can trigger a UE to switch to a dormancy/non-dormancy BWP on some Scells. The UE does not need to monitor PDCCH in dormancy BWP to save power. Bit '0' can mean indicate a dormancy BWP, and bit '1' can mean indicate a non-dormancy BWP.

Monitoring group flag indication: indicate which search space set group to monitor PDCCH. This indication is indicated in DCI format 2_0.

The techniques indicated by a DCI may suffer the problems that the indication comes from one TRP and the other TRP may not be synced on using the indication. The UE may receive different power saving indications from the different TRPs. In this case, the UE may not determine which one is valid and the power saving technology may not successfully be applied. If the UE cannot determine which indication is valid, the UE may lose some power saving improvement or cannot receive the data successfully. For example, if the UE receives two minimum scheduling offset indication values (e.g., one value is K0min=2, the other K0min=0), if UE does not know which one is valid one or more of the following three cases may occur:

1) At the UE, K0min=0 is valid, at the gNB, K0min=2 is valid. In this case, the UE may not be able to save power.
2) At the UE, K0min=2 is valid, at the gNB, K0min=0 is valid. In this case, the UE may not receive data successfully.
3) The UE and gNB have the same K0min value.

Case 3 above does not cause any problems because the gNB and the UE have the same value for the parameter. Disclosed is a method to align the power saving indication between the UE and gNB.

Disclosed are UE power saving techniques in multi-TRP including methods for indicating/determining a UE power saving parameter through multiple DCI, when to apply a UE power saving parameter, etc. Disclosed are techniques for the UE and/or gNB to determine which power saving indication is valid and how to apply a power saving parameter to save UE power.

A control resource set (CORESET) which is a set of physical resources and a set of parameters that are used to carry PDCCH/DCI. The parameters of a CORESET may be configured by RRC signaling. The information element (IE) ControlResourceSet is used to configure a time/frequency in which to search for downlink control information. Search space set is an area within a CORESET that UE should monitor to detect a specific PDCCH/DCI. One search space set can associate with one CORESET. The gNB sends DCI in time/frequency position configured by search space set and CORESET. The position when and where gNB can transmit a DCI is named PDCCH candidate. Different CORESETs or search spaces may transmit different types of DCI. The UE does not know where and when gNB will transmit a DCI. So, the UE may need to monitor every PDCCH candidate according to CORESET and search space configuration. A DCI may include several fields. Each field may include several bits and use to indication an information.

In an example embodiment, a wireless terminal may perform receiving, an indication information from a DCI (detailed below) and determining whether the indication information is valid according to predefined information and/or a high layer signaling (detailed below).

In an example embodiment, a next generation node B (also referred to as a gNodeB or gNB) or a base station may perform transmitting a high layer signaling to UE, and transmitting an indication information to UE.

A benefit of the foregoing embodiment is that the UE can determine which indication information is valid, and apply the power saving indication to save power.

Description of Indication Information, Predefined Information and High Layer Signaling In some embodiments, the indication information is a power saving indication information.

Power saving indication information (also referred to as power saving indication) is an indication of one or more power saving parameters of UE power saving techniques. The power saving indication information may include one or more of the following: a minimum scheduling offset indication, a wake-up indication, an SCell dormancy indication, a BWP indication, a maximum multiple input multiple output (MIMO) layer indication, a PDCCH skipping indication, a monitoring group flag indication, or a search space group switch indication. In some embodiments, the power saving indication information may include one or more of the following: a maximum CORESET number indication, a maximum search space set number indication, a maximum monitored PDCCH candidates number indication, a maximum control channel element (CCE) number indication, a maximum DCI size indication, or a maximum bandwidth indication.

In some embodiments, power saving parameter is at least one of the following: minimum scheduling offset, a PDCCH skipping duration, a bandwidth part, a maximum MIMO layer, search space set group index, an indication of wake-up, or an indication of SCell dormancy.

Minimum scheduling offset indication: indicates an index of minimum K0 (K0min) and/or a minimum K2 (K2 min). K0min denotes minimum value(s) for the time domain resource assignment (TDRA) table for a physical downlink shared channel (PDSCH) and for an aperiodic channel state information reference signal (A-CSI RS) triggering offset. K2 min denotes a minimum value for the time domain resource assignment table for a physical uplink shared channel (PUSCH). K0 is offset between a DCI and its scheduled PDSCH. K2 is offset between a DCI and its scheduled PUSCH. K0min and K2 min are power saving parameters.

Wake-up indication: indicate whether to wake up the UE for next the DRX cycle. Wake-up may mean start a DRX on-duration timer at the next DRX cycle.

SCell dormancy indication: indicate whether a SCell group switch to a dormancy BWP or a non-dormancy BWP.

Bandwidth part indication: indicate a BWP index.

Maximum MIMO layer indication: indicate a maximum MIMO layer.

PDCCH skipping indication: indicate whether a UE performs PDCCH skipping. PDCCH skipping may mean the UE does not monitor some PDCCH during a duration. In some embodiments, PDCCH skipping indicates a power saving parameter of the duration and the UE does not monitor PDCCH.

Monitoring group flag indication: indicate which search space set group to monitor PDCCH. This indication is indicated in DCI format 2_0.

Search space group switch indication (also referred to as search space set switch indication): indicate UE to monitor PDCCH in which search space set group. This indication may not be in DCI format 2_0.

Maximum CORESET number indication: indicate a maximum CORESET number can be configured in a downlink (DL) BWP.

Maximum search space set number indication: indicate a maximum search space set number can be configured in a BWP.

Maximum monitored PDCCH candidates number indication: indicate a maximum number of monitored PDCCH candidates per slot for a UE in a DL BWP.

Maximum control channel element (CCE) number indication: indicate a maximum number of non-overlapped CCEs for a DL BWP.

Maximum DCI size indication: indicate a maximum sizes of DCI formats UE monitored per serving cell.

Maximum bandwidth indication: indicate a maximum bandwidth for a BWP.

Predefined information is one or more of the following: DCI, radio network temporary identifier (RNTI), CORSET, subcarrier spacing (SCS), frequency range type (FR type), search space set, quasi co-location (QCL), TCI, default value, condition, K0, K2, or UE type.

QCL: two antenna ports are said to be quasi co-located if properties of the channel over which a symbol on one antenna port is conveyed can be inferred from the channel over which a symbol on the other antenna port is conveyed.

FR type: include frequency range 1 (FR1): e.g., 410 MHz-7125 MHz and Frequency range 2 (FR2): e.g., 24250 MHz-52600 MHz.

High layer signaling is a Layer 2(L2) or Layer 3(L3) signaling. For example, an RRC signaling or a medium access control control Element (MAC-CE) signaling.

In some embodiments, high layer signaling is CORESETPoolIndex. CORESETPoolIndex is configured for a CORESET and indicate an index of the CORESET pool for the CORESET. The index can have a value of '0' or '1'. A DCI monitored in a CORESET with the same CORESETPoolIndex value may be transmitted from the same TRP.

If a UE is configured by the higher layer parameter PDCCH-Config that contains two different values of CORESETPoolIndex in ControlResourceSet, the UE may expect to receive multiple PDCCHs scheduling fully/partially/non-overlapped PDSCHs in time and frequency domain.

In some embodiments, the first CORESET type is a CORESET configured with CORESETPoolIndex value 0 or a CORESET not configured with CORESETPoolIndex.

Description of Receive an Indication from a DCI

The indication may be transmitted via a DCI. Different indication information may transmit in different fields in a DCI or different DCIs. The DCI is associated with at least one of the following: a DCI format, a RNTI, a CORESET, a search space.

The DCI format may be one of the following: DCI format 0_0, DCI format 0_1, DCI format 0_2, DCI format 1_0, DCI format 1_1, DCI format 1_2, DCI format 2_0, DCI format 2_1, DCI format 2_2, DCI format 2_3, DCI format 2_6.

RNTI may be one of the following: cell radio network temporary identifier (C-RNTI), configured scheduling RNTI (CS-RNTI), modulation coding scheme (MCS-RNTI), slot format indication RNTI (SFI-RNTI), semi-persistent channel state information RNTI (SP-CSI-RNTI), Power saving RNTI(PS-RNTI).

In some embodiments, different kinds of power saving indications are transmitted via DCIs associated with different DCI formats and RNTIs. For example, a minimum scheduling offset indication is transmitted in minimum scheduling offset indicator field via DCI format 0_1 or 1_1 with CRC scrambling C-RNTI, MCS-C-RNTI, or CS-RNTI, and a wake-up indication is transmitted in a wake-up indication field via DCI format 2_6 with CRC scrambling PS-RNTI. An SCell dormancy indication is transmitted in SCell dormancy indication field via DCI format 2_6 with CRC scrambling PS-RNTI or a DCI format 0_1 or 1_1 with CRC scrambling C-RNTI, MCS-C-RNTI, or CS-RNTI. A monitoring group flag is transmitted via DCI format 2_0 with SFI-RNTI.

Determining Whether the Indication Information is Valid According to Predefined Information and/or a High Layer Signaling Indication information can be power saving indication information. Indication information is valid means UE will perform power saving techniques according to this indication information or the power saving parameter indicated by indication information will be applied after a timer or duration. In some embodiments, indication information is invalid means UE will ignore this indication information. In some embodiments, indication information is invalid means gNB does not send the indication information. In some embodiments, indication information is invalid means UE receive a DCI without a field of power saving indication information.

For example, the indication information is a minimum offset value indication information, if UE receives a valid indication information in a DCI, UE will apply the minimum offset (also referred as minimum scheduling offset) value after an application delay. If UE receives an invalid indication information in a DCI, UE will ignore the indication.

In some embodiments, high layer signaling includes CORESETPoolIndex. CORESETPoolIndex is configured for a CORESET and indicates an index of the CORESET pool for this CORESET. The index can be value '0' or '1'. In some embodiments, high layer signaling include UE capability signaling.

In some embodiments, if a UE is not configured by higher layer parameter PDCCH-Config that contains two different values of CORESETPoolIndex in ControlResourceSet, the indication information received in DCI is valid.

In some embodiments, a high layer signaling is a UE capability. If the UE reports a UE capability that supports an indication of 2 TCI states by a codepoint and/or DMRS ports within two CDM groups, the indication information the UE receives in a DCI is valid.

In some embodiments, a high layer signaling is a UE capability. If the UE reports a UE capability that support a number of CORESETs more than 3, the indication information UE receives in a DCI is invalid.

In some embodiments, a UE capability about whether the UE supports a power saving indication when the PDCCH-config contains two different values of CORESETPoolIndex. If UE reports support, the indication information UE receives is valid, otherwise, the indication information UE receives is invalid.

Determining Whether the Indication Information is Valid According to the Predefined Information As described above, indication information can include one or more power saving indication information. In some embodiments, which kind of power saving indication information is valid is determined according to predefined information and/or high layer signaling. Different power saving indications may have different validity. For example, some power saving indication information is valid, and some other is invalid. In some embodiments, a kind of power saving indication information received in different DCIs may have different validity. Predefined information and/or high layer signaling may be used to determine whether a received power saving indication is valid. For example, indication information received in a DCI which is monitored in a first CORESET type may be valid, and the indication information received in a DCI which is monitored in a second CORESET type may be invalid. In some embodiments, which kind of power saving indication information is valid and the power saving indication received in which a DCI is valid are both determined by predefined information and/or high layer signaling.

In some embodiments, predefined information is a CORESET. In this embodiment, a UE receives a high layer signaling configured a PDCCH-Config that contains two different values of CORESETPoolIndex in ControlResourceSet. In an example, the UE receives two DCIs carrying different indication information value. The two DCIs may be monitored in different CORESETs. The indication information received in a DCI which is monitored in a first CORESET type will be valid, the indication information received in a DCI which is monitored in a second CORESET type is invalid.

DCI monitored in one CORESET means DCI is associated with one CORESET.

In some embodiments, a first CORESET type is a CORESET configured with CORESETPoolIndex value X1 or monitored in a CORESET without CORESETPoolIndex. A second CORESET type is a CORESET configured with a CORESETPoolIndex value X2. X1 and X2 each have values of 0 or 1. In some embodiments, X1 is 0, X2 is 1.

Figure 1B:
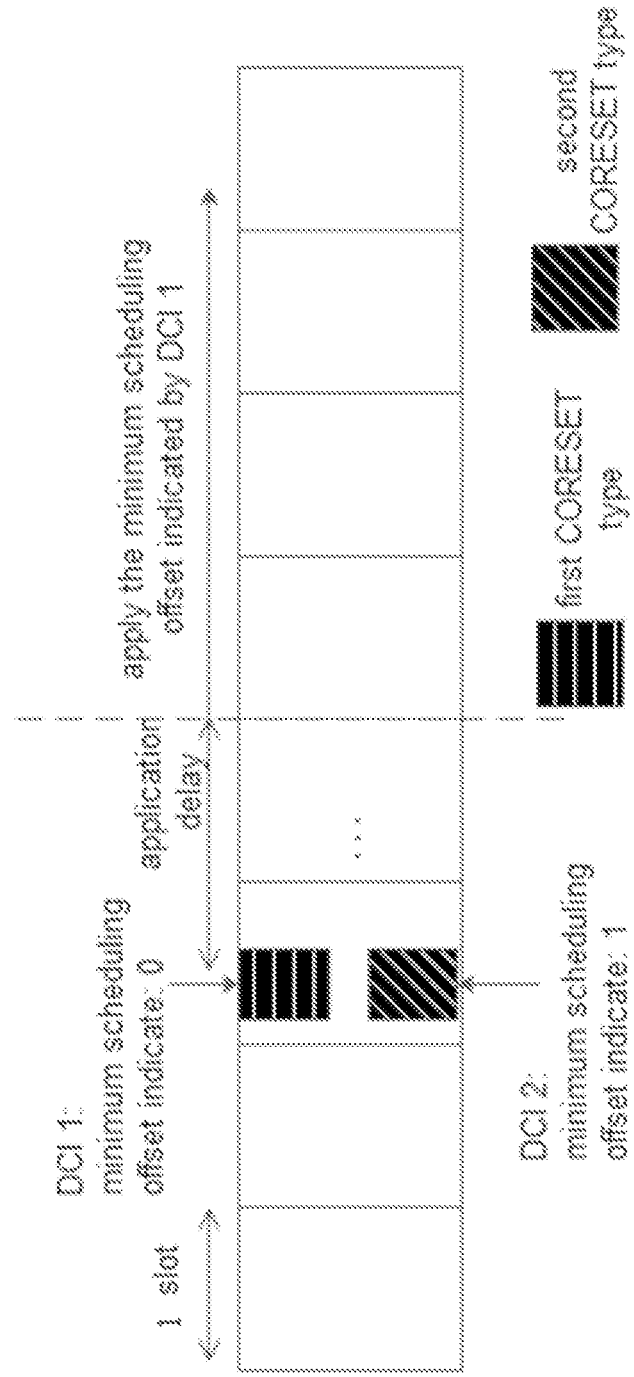
FIG. 1B depicts an example of control resource set (CORESET) as predefined information, in accordance with some example embodiments.

FIG. 1B depicts an example where a UE receives two DCIs in the same slot. One DCI (e.g., DCI 1) carries a minimum scheduling offset indicate value 0 and the other DCI (e.g., DCI 2) carries a minimum scheduling offset indicate value 1. DCI 1 is monitored in first CORESET type and DCI 2 is monitored in second CORESET type. The minimum scheduling offset indicated by DCI 1 is valid and will applied after an application delay. The minimum scheduling offset indicated by DCI 2 is invalid and will be ignored.

For another example, UE receives two DCIs in the same slot. One DCI (e.g., DCI 1) carries a wake-up indicate value 0 and the other DCI (e.g., DCI 2) carries a wake-up indicate value 1. DCI 1 is monitored in first CORESET type and DCI 2 is monitored in second CORESET type. The wake-up indication carried by DCI 1 is valid and will applied. The wake-up indication carried by DCI 2 is invalid and will be ignored.

For another example, UE receives two DCIs in the same slot. One DCI (e.g., DCI 1) carries a PDCCH skipping indicate value 0 and the other DCI (e.g., DCI 2) carries a PDCCH skipping indicate value 1. DCI 1 is monitored in first CORESET type and DCI 2 is monitored in second CORESET type. The PDCCH skipping indication carried by DCI 1 is valid and will applied. The PDCCH skipping indication carried by DCI 2 is invalid and will be ignored.

For another example, UE receives two DCIs in the same slot. One DCI (e.g., DCI 1) carries a search space group switch indicate value 0 and the other DCI (e.g., DCI 2) carries a search space group switch value 1. DCI 1 is monitored in first CORESET type and DCI 2 is monitored in second CORESET type. The search space group switch indication carried by DCI 1 is valid and will applied. The search space group switch indication carried by DCI 2 is invalid and will be ignored.

In some embodiments, a first CORESET type is a CORESET configured with a CORESETPoolIndex value the same as the CORESETPoolIndex value in a specific CORESET. A second CORESET type is a CORESET configured with a CORESETPoolIndex value different from the CORESETPoolIndex value in a specific CORESET. For a ControlResourceSet(or CORESET) without a CORESETPoolIndex, the UE may assume that the ControlResourceSet is assigned with CORESETPoolIndex as 0. In some embodiments, the specific CORESET is a CORESET in which DCI format 0_0 or DCI format 1_0 is monitored. In some embodiments, the specific CORESET is a CORESET in which DCI format 2_0 or 2_1 or 2_6 is monitored. In some embodiments, the specific CORESET is CORESET 0.

An example of a benefit of the predefined information being a CORESET, is that the gNB does not need to send additional signaling to indicate which indication information (or value) is valid. UE does not need to receive more signaling.

In some embodiments, predefined information is a condition. In some embodiments, the indication information is valid if at least one or more of the conditions satisfied: the indication information is a larger value; the indication information is a smaller value; the indication information is with lowest index; the indication information is with highest index; or the indication information is in a DCI with higher priority.

For example, indication information can be a minimum scheduling offset value, the UE receives two minimum scheduling offset value indication, and indication information indicating a larger minimum scheduling offset value is valid. The other one is invalid.

In another example, indication information can be a PDCCH skipping indication or maximum MIMO layer indication, the indication information with smaller value is valid. The other one is invalid.

In another example, indication information can be a wake-up indication, search space set switch indication or SCell dormancy indication, the indication information with lowest index is valid. The other one is invalid.

In another example, indication information can be a search space set switch indication or maximum MIMO layer indication the indication information with highest index is valid. The other one is invalid.

An example of a benefit of predefined information being a condition is that the UE can determine which indication value is valid of several indication values received from same TRP.

In some embodiments, predefined information is a search space set. In some embodiments, the indication information received in the DCI which is monitored in a first search space set type is valid and the indication information received in the DCI which is monitored in a second search space set type is invalid. In some embodiments, a first search space set type is a UE-specific search space (USS) set, a second search space set type is a common search space (CSS) set. Indication information received in the DCI which monitored in USS is valid and indication information received by DCI which is monitored in CSS is invalid. In some embodiments, the first search space set type is USS set and Type 3 CSS set. A second search space type is Type 0/0A/1/2 CSS set. In some embodiments, the first search space set type is search space set in search space sets with group index S1 and a second search space set type is search space in search space sets with group index S2. S1 and S2 may each be 0 or 1. In some embodiments, S1 is 1, S2 is 0. A group index indicates which kind of search space set type is configured for the search space set.

'Indication information received in the DCI which is monitored in' also means 'indication information received in the DCI is associate with'.

In some embodiments, predefined information is a DCI. In some embodiments, a DCI will indicate an information about which indication information is valid. In another word, a DCI includes information that related to a valid indication information. In some embodiments. A field in the DCI is used to indicate the information.

Example 1: one bit in a field of a DCI to indicates which indication information is valid. Value '0' in the field means indication information received in the first DCI type is valid; value '1' in the field means indication information received in second DCI type is valid. In some embodiments, first DCI type is DCI monitored in CORESET which configured with CORESETPoolIndex value '0' or CORESET without CORESETPoolIndex; second DCI type is DCI monitored in CORESET which configured with CORESETPoolIndex value '1'.

Example 2: two bits in a field of a DCI indicates which indication information is valid. Value '01' in the field means indication information received in first DCI type is valid; value '10' in the field means indication information received in second DCI type is valid; Value '00' means indication information is invalid for both first DCI type or second DCI type; value '11' means indication information is valid for both first DCI type or second DCI type.

In some embodiments, the DCI which indicate an information about which indication information is valid is at least one of the following: DCI format 2_0, DCI format 2_6, DCI format 2_1, DCI format 0_0, DCI format 1_0, DCI format 1_2 or DCI format 0_2.

In some embodiments, the DCI which indicate an information about which indication information is valid is scrambled by at least one of the following: cell radio network temporary identifier (C-RNTI), configured scheduling RNTI (CS-RNTI), modulation coding scheme (MCS)-C-RNTI, slot format indication RNTI (SFI-RNTI), System information RNTI(SI-RNTI), interruption RNTI (INT-RNTI), Power saving RNTI(PS-RNTI), or a specific RNTI. Specific RNTI is a RNTI scramble a DCI which indicate a valid indication information. In some embodiments, the DCI is monitored in CORESET 0. In some embodiments, the DCI is monitored in a USS or a type 3 CSS.

An example of a benefit of the predefined information being a DC is that the gNB can dynamically change which kind of indication information is valid.

In some embodiments, predefined information is a default value. In these embodiments, the UE is configured by higher layer parameter PDCCH-Config that contains two different values of CORESETPoolIndex in ControlResourceSet. In some embodiments, if the UE receives a DCI indicating a power saving indication information, the UE will apply a default value of the power saving indication technology and ignore the indicated value. In other words, the power saving indication information indicated by a DCI is re-interpreted as an enable information and indicates a default value of the power saving information.

- Example 1: When the UE receives a minimum scheduling offset indication, the UE will apply a K0min which is a default value after an application delay. In some embodiments, the default value may be the lowest index of K0min configured by RRC signaling.
- Example 2: When the UE receives a monitoring group flag or a search space set switch indication, the UE will monitor PDCCH in search space set group X. X is a default value of search space group index. In some embodiments, X is configured by high layer signaling or a predefined value.
- Example 3: When the UE receives a wake-up indication, the UE will determine whether or not to start a DRX on duration timer according to a default value. In some embodiments, the default value is configured by RRC signaling.
- Example 4: When the UE receives a PDCCH skipping indication, the UE will apply a performance according to a default value of PDCCH skipping indication. In some embodiments, the default value is predefined or configured by RRC signaling.

An example of a benefit is that the gNB and UE have a consistent understanding of the power saving indication information without additional DCI signaling. And UE can save power and receive data successfully.

In some embodiments, predefined information is a RNTI. For example, if a power saving indication information is in a DCI scrambled with a first RNTI type, the indication information is valid. Otherwise, the indication information is invalid. In some embodiments, first RNTI type is C-RNTI, MCS-C-RNTI. In some embodiments, first RNTI type is at least one of the following: CS-RNTI. C-RNTI, MCS-C-RNTI, PS-RNTI, SFI-RNTI.

In some embodiments, predefined information is a QCL. For example, if a power saving indication information is in a DCI which is QCL-ed with the lowest index CORESET in the same CORESETPoolIndex, the indication information is valid. Otherwise, the indication information is invalid. In another example, if a power saving indication information is in a DCI which is QCL-ed with the CORESET0, the indication information is valid. Otherwise, the indication information is invalid.

In some embodiments, predefined information is a SCS. For example, if a power saving indication information is received in a BWP with SCS smaller than T1, the indication information is valid. Otherwise, the indication information is invalid. The T1 is one of {30 kHz, 60 kHz, 120 kHz}.

In some embodiments, predefined information is a K0. For example, if a DCI indicate a K0 smaller than the applied K0min, the power saving indication information in the DCI is invalid, otherwise the power saving indication information in the DCI is valid.

In some embodiments, predefined information is a K2. For example, if a DCI indicate a K2 smaller than the applied K2 min, the power saving indication information in the DCI is invalid, otherwise the power saving indication information in the DCI is valid.

In some embodiments, predefined information is FR type. For example, if a power saving information is received in FR1, it is valid. Otherwise, the information indication is invalid.

In some embodiments, predefined information is TCI. If a DCI include a TCI field more than T2 bit, the power saving information indication in the DCI is invalid, otherwise the indication information is valid. T2 is one of {2,3}.

In some embodiments, predefined information is a UE type. For example, if the UE is a reduced capability UE, the power saving information indication in the DCI is invalid, otherwise the indication information is valid.

In some embodiments, predefined information is a DCI and a RNTI. For example, if the power saving indication information is carried in a DCI format 0_1 and scrambled with C-RNTI, CS-RNTI or MCS-C-RNTI, the power saving indication information is valid, otherwise, the indication information is invalid.

In some embodiments, predefined information is a search space set and a RNTI. For example, if the power saving indication information is carried in a DCI associate with USS set and scrambled with C-RNTI, CS-RNTI or MCS-C-RNTI, the power saving indication information is valid, otherwise, the indication information is invalid.

In some embodiments, predefined information is a FR type and a DCI. For example, if the power saving indication information is carried in a DCI format 0_1 or 1_1 in FR2, the power saving indication information is valid, otherwise, the indication information is invalid.

Determining Whether the Indication Information is Valid According to a High Layer Signaling In some embodiments, a high layer signaling indicates indication information in which a DCI is valid. In some embodiments, a high layer signaling indicate which kind of indication information is valid. For example, high layer signaling can indicate one or more of the following types of CORESET as a first CORESET type: CORESET with Pool index 0; CORESET with Pool index 1; or CORESET without Pool index. When the UE receives the high layer signaling, the indication information in the DCI monitored in the first CORESET type is valid. The indication information not associate with the first CORESET type is invalid.

In some embodiments, a high layer signaling is an enable/disable information associated with a DCI. The enable/disable information indicates the information indication in which DCI is valid. In some embodiments, a high layer signaling is an enable/disable information of a CORESET. For example, an enable/disable information configured in ControlResourceSet IE. If the information is an enable indication, the information indication in the DCI monitored in this CORESET is valid, otherwise, the information indication in the DCI associate with this CORESET is invalid. In some embodiments, a high layer signaling is an enable/disable information of a search space set. In some embodiments, a high layer signaling is an enable/disable information of a DCI format. In some embodiments, a high layer signaling is an enable/disable information of a RNTI.

In some embodiments, a high layer signaling can indicate one or more kind of indication information is invalid, if UE is configured by higher layer parameter PDCCH-Config that contains two different values of CORESETPoolIndex in ControlResourceSet. For example, if UE is configured by higher layer parameter PDCCH-Config that contains two different values of CORESETPoolIndex in ControlResourceSet, a high layer signaling indicate disable of PDCCH skipping indication. UE will ignore every PDCCH skipping indication received in DCI.

High layer signaling indication by an implicit method: implicit method is that gNB does not send a signaling which specific used to indicate which kind of indication is valid.

In some embodiments, UE configured by higher layer parameter PDCCH-Config that contains two different values of CORESETPoolIndex in ControlResourceSet, means disable of one or more kind of indication information. For example, if UE is configured by higher layer parameter PDCCH-Config that contains two different values of CORESETPoolIndex in ControlResourceSet, which means disable a kind of indication information(e.g., monitoring group flag indication). UE will ignore the monitoring group flag indication.

An example of a benefit of determining according to a high layer signaling is that the gNB can indicate which kind of indication information is valid according to a high layer signaling. Compared with indicating by a DCI, indicating by a high layer signaling may be easier to implement.

Determining Whether an Indication Information is Valid According to a Predefined Information and/or a High Layer Signaling In some embodiments, if at least one of high layer signaling or predefined information indicate a type of power saving indication information is invalid, the power saving indication information is invalid. In some embodiments, if a high layer signaling indicate a kind of power saving indication is valid, UE will follow the high layer signaling indication. In some embodiments, a high layer signaling may indicate which kind of power saving indication is valid. The UE will further determine the power saving indication received in which DCI is valid according to predefined information. For example, a high layer signaling indicate wake-up indication is valid, the UE and/or gNB determines the wake-up indication received in a DCI which is monitored in a CORESET with CORESETPoolIndex value 0 is a valid and wake-up indication received in a DCI which monitored in CORESET with CORESETPoolIndex value 1 is invalid. An example of a benefit is that the gNB can dynamically change the indication of which indication information is valid.

In some embodiments, UE and/or gNB determined whether a power saving information indication is valid during a duration.

In some embodiments, UE receives an indication information value during a duration, whether the indication information is valid is determined by a predefined signaling or a high layer signaling.

In some embodiments, the duration is the time between the slot in which UE receives the indication information in a DCI and the slot UE send an acknowledgement (ACK) or non-acknowledgement (NACK). In some embodiments, the duration is the time between the slot in which UE receives the indication information in a DCI and the slot UE apply the indication. In some embodiments, the duration is a predefined value. For example, P slots or P millisecond where P is greater than 0 and less than 10. In some embodiments, the duration can be infinite. In some embodiments, if the UE receives more than one indication information value from different CORESET type during a duration, one of the indication information value is valid. The valid indication information is determined by a predefined signaling or a high layer signaling.

In some embodiments, the indication information is valid if at least one of the following conditions satisfied: UE receives same indication information value from different/same CORESET type during a duration; UE receives only one indication information during a duration; or UE receives indication information from a same CORESET type during a duration.

The indication information is valid if UE receives same indication information value from different/same CORESET type during a duration means UE does not expect receive two different indication information value during a duration.

In some embodiments, the duration may be a slot, a symbol, a millisecond.

In some embodiments, UE receives two DCI simultaneously means UE receives two DCIs in a slot or a symbol or a millisecond.

In some embodiments, the indication information is invalid if UE receives more than one indication information value from different CORESET type during a duration. That is if UE receives different indication information value from different CORESET type during a duration, UE will ignore every indication information.

EXAMPLE

In this example, UE receives two DCI simultaneously. The two DCI may be monitored in a CORESET with the same or different CORESETPoolIndex value. Predefined information can include a CORESET. Simultaneously means receive in one slot or in one symbol or in one millisecond.

In some embodiments, if the two DCI received in CORESETs with same index of CORESET pool, the indication carried by the two DCI are both valid. Otherwise, the indication carried by the two DCI are both invalid.

In some embodiments, determine the validity of indication information based on a predefined information. The predefined information is a CORESET and a condition.

if the two indication information in a DCI received in CORESETs with different index of CORESET Pool, both two indication information are invalid, otherwise, if the two indication information in a DCI received in CORESETs with same index of CORESET pool, the indication information is valid if at least one of the following conditions is satisfied: indication information with larger value; indication information with smaller value; indication information with lowest index; indication information with highest index; indication information received in a DCI with higher priority; or indication information received in a first DCI type.

First DCI type may be one of the following: DCI format 1_1, DCI format 1_2, DCI format 2_6, DCI format 2_0, DCI format 2_2, DCI format 0_2, or DCI format 0_1.

In some embodiments, DCI priority is predefined or configured by high layer signaling or indicated in the DCI.

An example of a benefit is that the UE can determine which indication value is valid of several indication values received from same TRP in a duration.

In this embodiment, gNodeB (base station) transmit a resource configuration via high layer signaling to UE; and transmit the indication information in the resource to UE.

UE and/or gNB determines the indication is valid if high layer parameter PDCCH-Config contains two different values of CORESETPoolIndex in ControlResourceSet.

In some embodiments, the high layer signaling includes a resource configuration. The resource is the CORESET or search space set to transmit the indication information. In some embodiments, the location of the resource is configured based on a predefined condition. In some embodiments, the predefined condition is the UE reporting a UE capability that supports maximum number of CORESETs configured per "PDCCH-Config" is larger than 3. If the predefined condition is satisfied, the location of the resource is restricted. Otherwise, the location of the resource is not restricted.

In some embodiments, a predefined condition is the UE configured by high layer parameter PDCCH-Config that contains two different values of CORESETPoolIndex in ControlResourceSet. In some embodiments, if UE fulfills the condition, the location of the resource is restricted. Otherwise, the location of the resource is not restricted. For example, if the resource is restricted, the location of the resource about the indication information is restrict to a CORESET associate with the first CORESET type. If the resource is not restricted, the location of the resource can be any first or second CORESET type. In some embodiments, if the resource is restricted, the indication information transmitted is valid. In some embodiments, if the resource is not restricted, the validity of indication information transmitted is determined by predefined information and/or a high layer signaling.

In some embodiments, the resource is restricted to a CORESET associate with the first CORESET type. First CORESET type is CORESET which configured with CORESETPoolIndex value 0 or CORESET which does not configure with CORESETPoolIndex. Second CORESET type is CORESET which configured with CORESETPoolIndex value 1. In some embodiments, the DCI monitored in the resource is called the first type DCI. The second type DCI is a DCI not monitored in the resource which is CORESET which configured with CORESETPoolIndex value 1.

In some embodiments, an indication information can be indicated only in a first type DCI. In other words, the DCI with power saving indication information can only be monitored in the resource. The indication field is at least one of the following: a minimum scheduling offset indication field, a Wake-up indication field, a SCell dormancy indication field, a maximum MIMO layer indication field, a PDCCH skipping indication field, a Monitoring group flag indication, a search space set switch indication field. For example, the resource is restricted to a CORESET associate with the first CORESET type, and first type DCI is DCI format 0_1 or 1_1. the indication field is a minimum applicable scheduling offset indication field. The minimum scheduling offset indication can be transmitted in the resource and is valid. a minimum applicable scheduling offset indication field will present in DCI format 0_1 or 1_1 if high layer signaling configured a minimum applicable scheduling offset K0 (K0min) in DL BWP or minimum applicable scheduling offset K2(K2 min) in UL BWP. The PDCCH monitor occasion for the DCI format 0_1 or 1_1 is configured only in first type of CORESET. So, the UE monitors the DCI format with minimum applicable scheduling offset indication field only in first type of CORESET. If UE receive a DCI format 0_1 or 1_1 with a minimum scheduling offset, the indication is valid and UE will applied after an application delay. For another example, the resource is restricted to a CORESET inside active time, and first type DCI is DCI format 2_6. the indication field is a Wake-up indication field and a SCell dormancy indication field. With means Wake-up indication and SCell dormancy indication can only be transmitted in the resource. And the indication information is valid. For another example, the resource is restricted to a CORESET associate with the first CORESET type, and first type DCI is DCI format 0_1 or 1_1. the indication field is a PDCCH skipping or search space group switch indication field. The PDCCH skipping or search space group switch indication can only be transmitted in the resource and is valid.

In some embodiments, the bitwidth of the indication field may be 0. And it means the indication information is invalid or the indication field is absent. In another words, the indication field bitwidth is 0 bit means the DCI does not have the indication field.

An example of a benefit is that the determination of which power saving indication information is valid in UE is simple and reduce the complexity of data processing.

Applied Range of the Indication Information if the Indication Information is Valid.

The UE is configured by higher layer parameter PDCCH-Config that contains two different values of CORESET-PoolIndex in ControlResourceSet. The UE receives a DCI with indication information.

In some embodiments, if the indication information is valid, the indication information is valid for all DCI.

In some embodiments, if the indication information is valid, the indication information received in a DCI will be applied (or valid) only for a DCI which is monitored in, or associate with, a CORESET which is configured with an index of CORESET Pool that is the same as the CORESET which carries the indication information. The DCI which is monitored in CORESET with different index of CORESET Pool from the index of CORESET Pool of the CORESET associate with the DCI carried the indication information cannot apply the indication. In some embodiments, if the indication information is valid, it may be valid in some cases and not valid in other cases.

Example 1: In this example, the indication information is a minimum scheduling offset indication (also referred to as a "minimum applicable scheduling offset"). If UE receive a minimum scheduling offset indication in a DCI which is monitored in a CORESET. The CORESET is a first type of CORESET. The K0min or K2 min indicated will applied after an application delay. If the K0min or K2 min is applied, UE does not expect to receive a DCI which monitored in the first CORESET type indicate a K0 or aperiodic CSI-RS triggering offset value smaller than K0min if K0min is indicated. UE does not expect to receive a DCI which monitored in the first CORESET type indicate a K2 value smaller than K2 min if K2 min is indicated. UE can receive a DCI which monitored in second CORESET type indicate a K2 value smaller than K2 min if K2 min is indicated. UE can receive a DCI which monitored in second CORESET type indicate a K0 or aperiodic CSI-RS triggering offset value smaller than K0min if K0min is indicated.

Example 2: In this example, the indication information is a monitoring group flag indication. If UE receive a DCI which monitored in a CORESET indicate a monitoring group index. The CORESET is a first type of CORESET. The UE monitors PDCCH according to search space sets with indicated group index if the search space sets associate with the first CORESET type. The UE monitors PDCCH according to search space sets originally if the search space sets associate with the second CORESET type. In another words, the search space sets associate with the first CORESET type will change according to the monitoring group index. The search space sets associate with the second CORESET type will not change.

In some embodiments, first type of CORESET is CORESET which configured with CORESETPoolIndex value 0 or a CORESET which does not configure with CORESETPoolIndex. Second type of CORESET is CORESET which configured with CORESETPoolIndex value 1. 'first type of CORESET' is same as 'first CORESET type', 'second type of CORESET' is same as 'second type of CORESET'.

UE Behavior after Receiving a Valid Indication Information.

In some embodiments, if UE receive a valid power saving indication information, the indication information will be applied after a time duration. In some time, the time duration is called application delay.

In some embodiments, if UE receive an information indication from a first DCI. The first DCI may be first type DCI or second type DCI. UE can receive another information indication from a second DCI which type is different from the first DCI before the information indication indicated by the first DCI is applied. UE does not expect to receive another information indication from a second DCI which type is same as the first DCI before the information indication indicated by the first DCI is applied. For example, the information indication is minimum scheduling offset indication. UE receives an indication from a first DCI which is first type DCI. UE will apply the indicated K0min or K2 min after an application delay. During the application delay, UE can receive another minimum scheduling offset indication from a second DCI which is second type DCI, and UE does not expect to receive another minimum scheduling offset indication from a second DCI which type is first type DCI.

In some embodiments, the first type DCI is a DCI monitored in a CORESET with CORESETPoolIndex value '0' or a CORESET without CORESETPoolIndex. The second type DCI is a CORESET with CORESETPoolIndex value '1'.

An example of a benefit is that different TRPs can apply different power saving indication information values and the gNB does not need to send an additional signal.

In some embodiments, if a UE receive a valid power saving indication information, UE does not monitor PDCCH before the indication information is applied. In some embodiments, if a UE receive a valid power saving indication information, UE does not monitor PDCCH before the scheduled PDSCH/PUSCH is received/transmitted. In some embodiments, if a UE receives a valid power saving indication information, the UE does not monitor the PDCCH before sending an ACK/NACK. In another words, after determining that the indication information is valid, the US may not monitor a physical downlink control channel (PDCCH) for a duration. The duration may include one or more of: a duration between the slot in which receiving the indication information and the slot apply the indication information; a duration between the slot in which receiving the indication information and the slot transmit a physical downlink shared channel (PDSCH) or physical uplink shared channel (PUSCH).

When to Apply the Indication Information if One Indication Information is Valid

If UE receives indication information indicated by a DCI and the indication information is valid. In some embodiments, the valid indication information received is applied after a timer or a time duration. The timer or time duration can be called application delay.

In some embodiments, the indication information received in first condition is applied same time as an indication information received in second condition. In another word, the time duration is same. In some embodiments, the indication information received in first condition is applied different time from the indication information received in second condition. In some embodiments, the indication information received in first condition is applied the slot/millisecond after UE transmit an ACK/NACK.

In some embodiments, the timer is associate with drx-RetransmissionTimerDL or drx-RetransmissionTimerUL or drx-HARQ-RTT-TimerDL or drx-HARQ-RTT-TimerUL.

In some embodiments, the indication information received in first condition is applied after a timer. For example, the timer is drx-RetransmissionTimerDL or drx-RetransmissionTimerUL or drx-RetransmissionTimerDL+drx-HARQ-RTT-TimerDL or drx-RetransmissionTimerUL+drx-HARQ-RTT-TimerUL.

First condition is UE configured by higher layer parameter PDCCH-Config that contains two different values of CORESETPoolIndex in ControlResourceSet. Second condition is UE configured by higher layer parameter PDCCH-Config that contains only one value of CORESETPoolIndex in ControlResourceSet or UE configured by higher layer parameter PDCCH-Config that does not contains a CORESETPoolIndex in ControlResourceSet.

Embodiments of Single-DCI Based Multi-TRP

If a UE receives a DCI indicating two transmission configuration indication (TCI) states by a codepoint, it means the UE receives a DCI may schedule more than one single-DCI based multi-TRP (PDSCH).

Determine Whether an Indication Information is Valid for Single-DCI Based Multi-TRP:

In some embodiments, predefined information is a DCI.

In some embodiments, if a DCI indicates 2 TCI states by a codepoint, the power saving indication information indicated in the DCI is valid.

In some embodiments, if a DCI indicates 2 TCI states by a codepoint, the power saving indication information indicated in the DCI is invalid.

In some embodiments, if a DCI indicates 2 TCI states by a codepoint, and the DCI also indicate a power saving indication information, the first kind of power saving indication information is valid and the second kind of power saving indication information is invalid.

First and second type of power saving indication include one or more power saving indication information, and one power saving indication information can only include one type. For example, minimum scheduling offset indication is first kind of power saving indication, so if UE receives a DCI indicate 2 TCI states by a codepoint, and the DCI also indicate a minimum scheduling offset indication information, the minimum scheduling offset is valid.

In some embodiments, a first kind of power saving indication includes at least one of the following: a wake-up indication, a minimum scheduling offset indication, or a PDCCH skipping indication.

In some embodiments, UE and/or gNB determine whether an indication information is valid according to a predefined information and a high layer signaling.

In some embodiments, if a high layer signaling indicates a 'FDMSchemeA', 'FDMSchemeB', 'TDMSchemeA' or a DCI indicate a 'RepNumR16', and the DCI indicate 2 TCI states by a codepoint, the power saving indication information is invalid.

When to Apply the Indication Information for Single DCI Based Multi-TRP:

In some embodiments, the power saving indication information will be applied after an application delay. The application delay is same as the application delay configured when the indication is received in a DCI with 1 TCI state.

In some embodiments, the power saving indication information will be applied after an application delay. The application delay is different from the application delay configured when the indication is received in a DCI with 1 TCI state.

In some embodiments, the power saving indication information will be applied after all PDSCH which scheduled by the DCI is received.

In some embodiments, the power saving indication information will be applied after UE send an ACK/NACK.

UE behavior after receiving a valid power saving indication information for single DCI based multi-TRP:

In some embodiments, if a UE receive a valid power saving indication information, UE does not monitor PDCCH before the indication information is applied.

In some embodiments, if a UE receive a valid power saving indication information, UE does not monitor PDCCH before the scheduled PDSCH/PUSCH is received/transmitted.

In some embodiments, if a UE receive a valid minimum scheduling offset indication(K0min) and the DCI indicates 2 TCI states by a codepoint, UE will receive the corresponding PDSCHs which the offset between the DCI and PDSCH is larger than the K0min.

Figure 3:
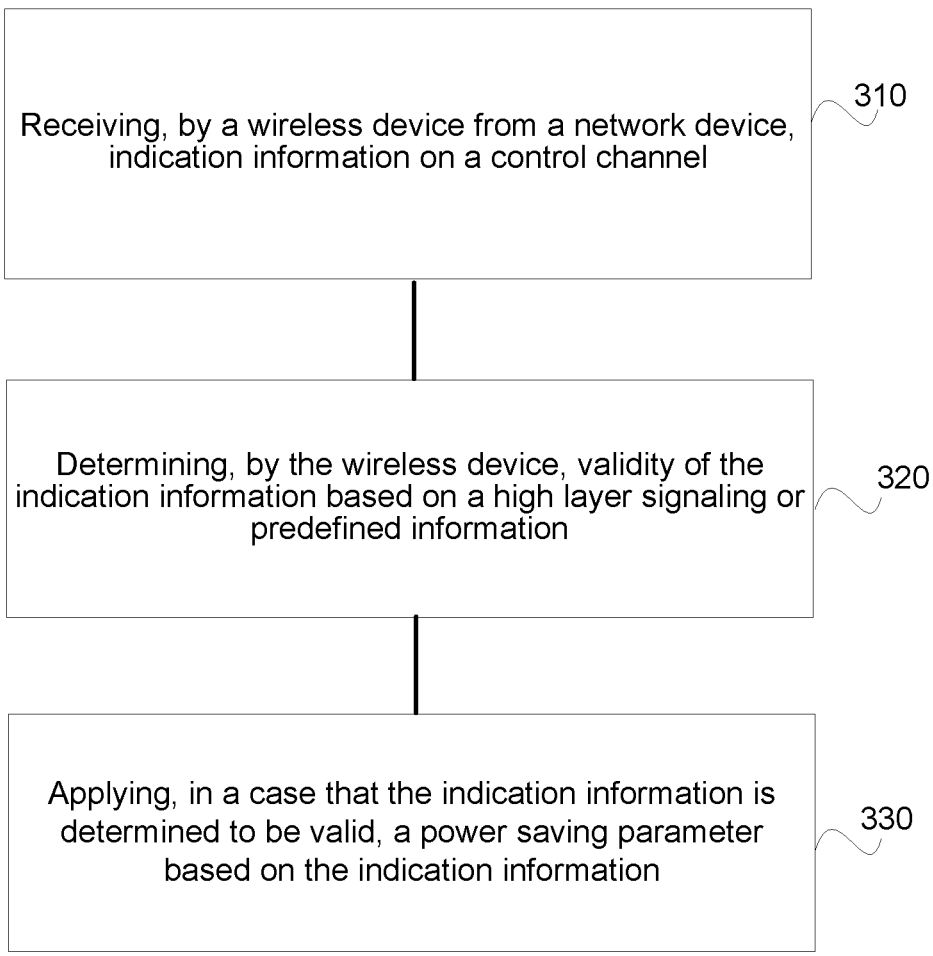
FIG. 3 depicts an example of a process, in accordance with some example embodiments.

FIG. 3 depicts an example of a method 300, in accordance with some example embodiments. At 310, the method includes receiving, by a wireless device from a network device, indication information on a control channel. At 320, the method includes determining, by the wireless device, validity of the indication information based on a high layer signaling or predefined information. At 330, the method includes applying, in a case that the indication information is determined to be valid, a power saving parameter based on the indication information.

FIG. 4 depicts another example of a method 400, in accordance with some example embodiments. At 410, the method includes transmitting, by a network device to a wireless device, a resource configuration via high layer signaling. At 420, the method includes determining, by the network device, validity of indication information based on the high layer signaling or predefined information. At 430, the method includes transmitting, to the wireless device, the indication information in a resource configured by the resource configuration.

Figure 5:
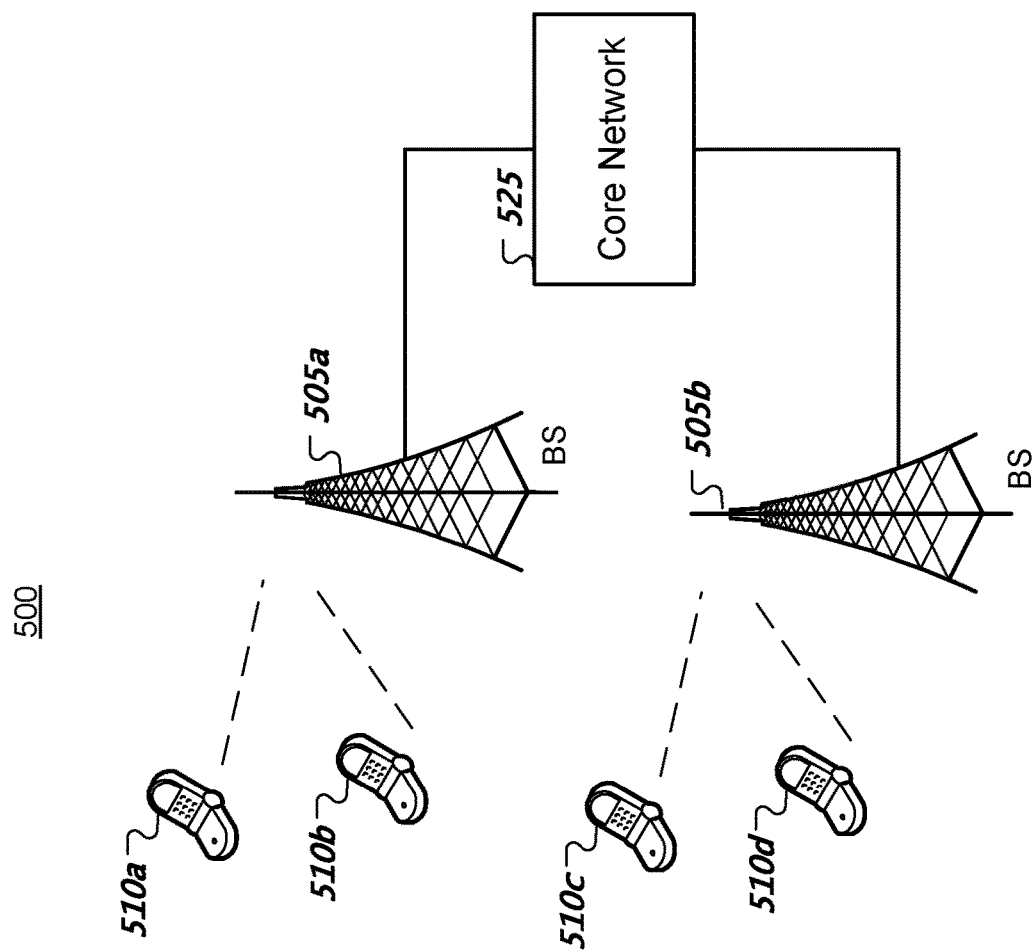
FIG. 5 depicts an example of a wireless communication system, in accordance with some example embodiments.

FIG. 5 shows an example of a wireless communication system 500 where techniques in accordance with one or more embodiments of the present technology can be applied. A wireless communication system 500 can include one or more network devices such as one or more base stations (BSs, gNB, eNB, etc.) 505a, 505b, one or more wireless devices 510a, 510b, 510c, 510d, and a core network 525. A network device, e.g., base station 505a, 505b can provide wireless service to wireless devices 510a, 510b, 510c and 510d in one or more wireless sectors. In some implementations, a network device, e.g., a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies. The techniques and embodiments described in the present document may be implemented by the base stations, other network entities, and/or by wireless devices described in the present document, or a combination of base station and mobile device equipment.

Figure 6:
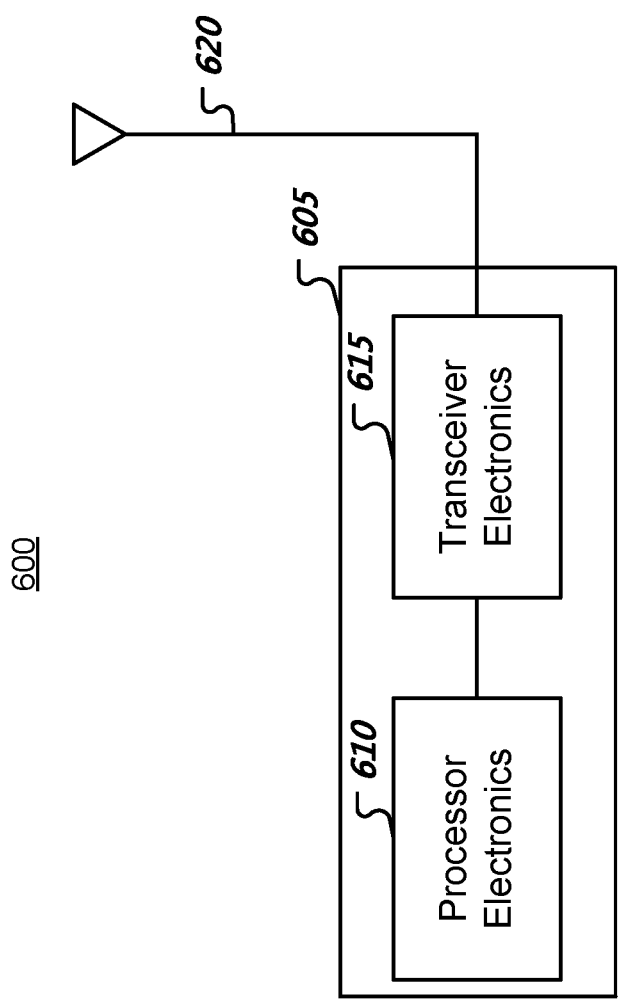
FIG. 6 depicts an example block diagram of a portion of a radio system, in accordance with some example embodiments.

FIG. 6 is a block diagram representation of a portion of a radio station in accordance with one or more embodiments of the present technology can be applied. A radio station 605 such as a base station, other network entity, or a wireless device (or UE) can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605. In some embodiments, the radio station 605 may be configured to perform the methods described herein.

SOME DISCLOSED EXAMPLES

Disclosed are techniques for determining whether an indication information is valid and how to apply a valid indication in multi-TRP. 'Indication information' may be 'power saving indication information'.

In some example embodiments, the UE receives an indication information value during a duration, whether and which indication information is valid is determined by a predefined signaling or a high layer signaling.

In some example embodiments, whether the indication information is valid is determined by a predefined information. predefined information is a CORESET. The indication information received in a DCI which is monitored in a first CORESET type will be valid, The indication information received in a DCI which is monitored in a second CORESET type is invalid.

In some example embodiments, a first CORESET type is CORESET configured with CORESETPoolIndex value X1 or monitored in a CORESET without CORESETPoolIndex. Second CORESET type is CORESET configured with CORESETPoolIndex value X2. X1 and X2 is 0 or 1. In some embodiments, X1 is 0, X2 is 1.

In some example embodiments, the indication information is applied at least for the DCI which monitored in CORESET with same CORESETPoolIndex value.

In some example embodiments, whether the indication information is valid is determined by a high layer signaling. if UE is configured by higher layer parameter PDCCH-Config that contains two different values of CORESET- PoolIndex in ControlResourceSet, one or more kind of indication information is invalid. Otherwise, indication information is valid.

In some example embodiments, if at least one of high layer signaling or predefined information indicate a kind of power saving indication information is invalid, the power saving indication information is invalid.

Clause 1. A wireless communication method (e.g., method 300 shown in FIG. 3), comprising: receiving (310), by a wireless device from a network device, indication information on a control channel; determining (320), by the wireless device, validity of the indication information based on a high layer signaling or predefined information; and applying (330), in a case that the indication information is determined to be valid, a power saving parameter based on the indication information.

Clause 2. The method of clause 1, wherein after determining that the indication information is valid, refraining, for a predefined duration, from monitoring a physical downlink control channel (PDCCH), wherein the predefined duration is at least one of: a first duration between a first slot in which the indication information is received and a second slot in which the indication information is applied; or a second duration between the first slot and a third slot in which a physical downlink shared channel (PDSCH) or physical uplink shared channel (PUSCH) is transmitted. In some embodiments, if a UE receive a valid power saving indication information, UE does not monitor PDCCH before the indication information is applied. In some embodiments, if a UE receive a valid power saving indication information, UE does not monitor PDCCH before the scheduled PDSCH/PUSCH is received/transmitted.

Clause 3. The method of clause 1, wherein the indication information is related to a power saving parameter of the wireless device.

Clause 4. The wireless communication method of clause 1, wherein the indication information includes one or more of: a wake-up indication, a secondary cell (SCell) dormancy indication, a monitoring group flag indication, or a search space group switch indication.

Clause 5. The wireless communication method of clause 1, wherein the indication information includes one or more of: a minimum scheduling offset indication, a maximum multiple input multiple output (MIMO) layer indication, or a physical downlink control channel (PDCCH) skipping indication.

Clause 6. The wireless communication method of clause 5, wherein the predefined information comprises a control resource set (CORESET), and wherein the received indication information is associated with a first CORESET type is valid indication information, and wherein a second indication information received on the control channel is associated with a second CORESET type that is invalid indication information.

Clause 7. The wireless communication method of clause 6, wherein the first CORESET type is configured with a CORESETPoolIndex value X1 or without the CORESETPoolIndex, or a second CORESET type is configured with the CORESETPoolIndex value X2, wherein X1 and X2 each have a value of 0 or 1.

Clause 8. The wireless communication method of clause 1, wherein the predefined information is a search space set.

Clause 9. The wireless communication method of clause 8, wherein the indication information received in the control channel is associated with a first search space set type that is valid, and a second indication information received in the control channel is associated with a second search space set type that is invalid.

Clause 10. The wireless communication method of clause 9, wherein the first search space set type is a user equipment specific search space (USS) set, and wherein the second search space set type is a common search space (CSS) set.

Clause 11. The wireless communication method of clause 1, wherein the predefined information is a downlink control information (DCI).

Clause 12. The wireless communication method of clause 11, wherein the DCI includes information that related to a valid indication information.

Clause 13. The wireless communication method of clause 1, wherein in a case that the wireless device is configured by a higher layer parameter including physical downlink control channel (PDCCH) configuration (PDCCH-Config) that contains a first CORESET with a first CORESETPoolIndex value and a second CORESET with a second CORESETPoolIndex value and the first CORESETPoolIndex value is different from the second CORESETPoolIndex value, the indication information is invalid.

Clause 14. The wireless communication method of clause 1, wherein in a case that the wireless device receives a DCI including the indication information, the indication information is invalid and interpreted as an enable message and the wireless device applies a default value and ignores the indication information.

Clause 15. The wireless communication method of clause 14, wherein the default value is predefined or configured by a radio resource control (RRC) signaling.

Clause 16. The wireless communication method of clause 1, wherein a higher layer signaling includes information about at least one type of valid indication information, and wherein the wireless device determines the validity of the indication information based on the high layer signaling.

Clause 17. The wireless communication method of clause 1, wherein the predefined information indicates a condition for the indication information to be valid, wherein the condition includes at least one of: the wireless device receives a same indication information value from a different CORESET type during a duration; the wireless device receives one indication information during a duration; or the wireless device receives the indication information from a same CORESET type during a duration.

Clause 18. The wireless communication method of clause 1, wherein the predefined information is a CORESET and a condition.

Clause 19. The wireless communication method of clause 18, wherein in a case that a plurality of indication information is associated with one or more CORESETs are configured for a same index of a CORESET Pool, a particular indication information is valid when: the particular indication information has larger value than one or more other indication information; the particular indication information has a smaller value than the one or more other indication information; the particular indication information has a lowest index compared to the one or more other indication information; the particular indication information has a higher index compared to the one or more other indication information; the particular indication information is received in a DCI with a higher priority compared to the one or more other indication information; or the particular indication information is received in a first type of DCI.

Clause 20. The wireless communication method of clause 1, wherein the predefined information includes one or more of: a downlink control information (DCI), a radio network temporary identifier (RNTI), a CORSET, a subcarrier spacing (SCS), a frequency range type (FR type), a search space set, a quasi co-location (QCL), a transmission configuration information (TCI), a default value, a condition, a K0 scheduling offset value, or a K2 scheduling offset value.

Clause 21. The wireless communication method of clause 1, wherein the predefined information comprises a control resource set (CORESET).

Clause 22. The wireless communication method of any of clauses 1-21, wherein in a case that the indication information is valid, the indication information is applied only for the control channel associated with a first CORESET configured with an index of a CORESET Pool with a same index value as a second CORESET in which the indication information is received. In some example embodiments, if the indication information is valid, the indication information received in a DCI will be applied (or valid) only for a DCI which is monitored in, or associate with, a CORESET which configured with an index of CORESET Pool same as the CORESET which carry the indication information.

Clause 23. The wireless communication method of clauses 1-21, wherein a valid indication information received is applied after a timer or a time duration.

Clause 24. The wireless communication method of any of clauses 1 to 23, wherein the control channel is a physical downlink control channel (PDCCH).

Clause 25. A wireless communication method, comprising: transmitting, by a network device to a wireless device, a resource configuration via a high layer signaling; determining, by the network device, validity of indication information based on the high layer signaling or predefined information; and transmitting, to the wireless device, the indication information in a resource configured by the resource configuration.

Clause 26. The wireless communication method of clause 25, wherein a location of the resource is configured based on the predefined condition.

Clause 27. The wireless communication method of clause 25, wherein after the indication information is determined to be valid, a power saving parameter of the wireless device is applied based on the indication information.

Clause 28. The wireless communication method of clause 27, wherein the indication information is related to a power saving parameter of the wireless device.

Clause 29. The wireless communication method of clause 25, wherein the indication information includes one or more of: a minimum scheduling offset indication, a wake-up indication, a secondary cell (SCell) dormancy indication, a bandwidth part (BWP) indication, a maximum multiple input multiple output (MIMO) layer indication, a physical downlink control channel (PDCCH) skipping indication, a monitoring group flag indication, or a search space group switch indication.

Clause 30. The wireless communication wireless communication method of any of clauses 1 to 29, wherein the wireless device is a mobile terminal.

Clause 31. The wireless communication method of any of clauses 1 to 30, wherein the network device is a base station of the wireless network.

Clause 32. A computer program product having code stored thereon, the code, when executed by a processor, causing the processor to implement the method of any of clauses 1 to 31.

Clause 33. A wireless device, comprising: a transceiver configured to receive from a network device indication information on a control channel, and a processor configured to determine validity of the indication information based on a high layer signaling or predefined information, and apply, in a case that the indication information is determined to be valid, a power saving parameter based on the indication information.

Clause 34. The wireless device of clause 33, wherein the processor is further configured to perform the wireless communication method of any of clauses 2 to 23.

Clause 35. A network device, comprising: a transceiver configured to transmit to a wireless device a resource configuration via high layer signaling, and transmit to the wireless device indication information in a resource configured by the resource configuration; and a processor configured to determine validity of indication information based on the high layer signaling or predefined information.

Clause 36. The network device of clause 35, wherein the processor is further configured to perform the wireless communication method of any of clauses 25 to 29.

It will be appreciated that the present document discloses several techniques that may be used by wireless device such as mobile phones or other computing platforms to reduce power consumption. The disclosed techniques may be used to, for example, determine validity of an indication before the indication is used for altering or enforcing a power saving mechanism used by the wireless device.

It will be appreciated that the present document discloses techniques that can be embodied in various embodiments to establish and manage sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
   receiving, by a wireless device from a network device, indication information on a control channel;
   determining, by the wireless device, validity of the indication information based on a high layer signaling or predefined information; and
   applying, in a case that the indication information is determined to be valid, a power saving parameter based on the indication information,
      wherein the predefined information comprises a control resource set (CORESET),
      wherein the received indication information is associated with a first CORESET type is valid indication information, and
      wherein a second indication information received on the control channel is associated with a second CORESET type that is invalid indication information,
      wherein the predefined information is a search space set,
      wherein the indication information received in the control channel is associated with a first search space set type that is valid, and a second indication information received in the control channel is associated with a second search space set type that is invalid.

2. The wireless communication method of claim 1, wherein after determining that the indication information is valid, refraining, for a predefined duration, from monitoring a physical downlink control channel (PDCCH), wherein the predefined duration is at least one of:
   a first duration between a first slot in which the indication information is received and a second slot in which the indication information is applied; or
   a second duration between the first slot and a third slot in which a physical downlink shared channel (PDSCH) or physical uplink shared channel (PUSCH) is transmitted.

3. The wireless communication method of claim 1, wherein the indication information is related to a power saving parameter of the wireless device.

4. The wireless communication method of claim 1, wherein the indication information includes one or more of:
   a wake-up indication,
   a secondary cell (SCell) dormancy indication,
   a monitoring group flag indication, or
   a search space group switch indication.

5. The wireless communication method of claim 1, wherein the indication information includes one or more of:
   a minimum scheduling offset indication,
   a maximum multiple input multiple output (MIMO) layer indication, or
   a physical downlink control channel (PDCCH) skipping indication.

6. The wireless communication method of claim 1, wherein the first CORESET type is configured with a CORESETPoolIndex value X1 or without the CORESET- PoolIndex, or a second CORESET type is configured with a CORESETPoolIndex value X2, wherein X1 and X2 each have a value of 0 or 1.

7. The wireless communication method of claim 1, wherein the first search space set type is a user equipment specific search space (USS) set, and wherein the second search space set type is a common search space (CSS) set.

8. The wireless communication method of claim 1, wherein the predefined information is a downlink control information (DCI).

9. The wireless communication method of claim 8, wherein the DCI includes information that related to a valid indication information.

10. The wireless communication method of claim 1, wherein in a case that the wireless device is configured by a higher layer parameter including physical downlink control channel (PDCCH) configuration (PDCCH-Config) that contains a first CORESET with a first CORESETPoolIndex value and a second CORESET with a second CORESETPoolIndex value and the first CORESETPoolIndex value is different from the second CORESETPoolIndex value, the indication information is invalid.

11. The wireless communication method of claim 1, wherein in a case that the wireless device receives a DCI including the indication information, the indication information is invalid and interpreted as an enable message and the wireless device applies a default value and ignores the indication information.

12. The wireless communication method of claim 11, wherein the default value is predefined or configured by a radio resource control (RRC) signaling.

13. The wireless communication method of claim 1, wherein a higher layer signaling includes information about at least one type of valid indication information, and wherein the wireless device determines the validity of the indication information based on the high layer signaling.

14. The wireless communication method of claim 1, wherein the predefined information indicates a condition for the indication information to be valid, wherein the condition includes at least one of:
the wireless device receives a same indication information value from a different CORESET type during a duration;
the wireless device receives one indication information during a duration; or
the wireless device receives the indication information from a same CORESET type during a duration.

15. The wireless communication method of claim 1, wherein the predefined information is a CORESET and a condition.

16. The wireless communication method of claim 15, wherein in a case that a plurality of indication information is associated with one or more CORESETs are configured for a same index of a CORESET Pool, a particular indication information is valid when:
the particular indication information has larger value than one or more other indication information;
the particular indication information has a smaller value than the one or more other indication information;
the particular indication information has a lowest index compared to the one or more other indication information;
the particular indication information has a higher index compared to the one or more other indication information;
the particular indication information is received in a DCI with a higher priority compared to the one or more other indication information; or
the particular indication information is received in a first type of DCI.

17. The wireless communication method of claim 1, wherein the predefined information includes one or more of:
a downlink control information (DCI),
a radio network temporary identifier (RNTI),
a CORSET,
a subcarrier spacing (SCS),
a frequency range type (FR type),
a search space set,
a quasi co-location (QCL),
a transmission configuration information (TCI),
a default value,
a condition,
a K0 scheduling offset value, or
a K2 scheduling offset value.

18. An apparatus for wireless communication comprising: a memory; and one or more processors configured to read instructions from the memory and cause the apparatus to implement a method, comprising:
receive, from a network device, indication information on a control channel;
determine validity of the indication information based on a high layer signaling or predefined information; and
apply, in a case that the indication information is determined to be valid, a power saving parameter based on the indication information,
wherein the predefined information comprises a control resource set (CORESET),
wherein the received indication information is associated with a first CORESET type is valid indication information, and
wherein a second indication information received on the control channel is associated with a second CORESET type that is invalid indication information,
wherein the predefined information is a search space set,
wherein the indication information received in the control channel is associated with a first search space set type that is valid, and a second indication information received in the control channel is associated with a second search space set type that is invalid.

19. The apparatus of claim 18, wherein after the indication information is valid is determined, refrain, for a predefined duration, from monitoring a physical downlink control channel (PDCCH), wherein the predefined duration is at least one of:
a first duration between a first slot in which the indication information is received and a second slot in which the indication information is applied; or
a second duration between the first slot and a third slot in which a physical downlink shared channel (PDSCH) or physical uplink shared channel (PUSCH) is transmitted.

20. The apparatus of claim 18, wherein the indication information is related to a power saving parameter of the wireless device.

* * * * *